Patented June 16, 1925.

1,541,910

UNITED STATES PATENT OFFICE.

HANS FRIEDENTHAL, OF BERLIN-CHARLOTTENBURG, GERMANY, ASSIGNOR TO IN-DUSTRIE-VERWALTUNG-AKTIENGESELLSCHAFT, OF BERLIN, GERMANY, A STOCK COMPANY OF GERMANY.

BROMINE SOLUTION.

No Drawing. Application filed May 10, 1924. Serial No. 712,429.

*To all whom it may concern:*

Be it known that I, HANS FRIEDENTHAL, a citizen of Germany, residing in the city of Berlin-Charlottenburg, Germany, have invented certain new and useful Improvements in Bromine Solutions, of which the following is a specification.

This invention has reference to means of producing bromine solutions at a comparatively low cost, and without the use of the expensive haloid-salts and other costly solvents heretofore used for this purpose, and it is a further object of my invention to provide a perfect and highly efficient substitute for iodine tincture in all its applications, and to produce bromine solutions of a high degree of permanency, and adapted for application for all the various uses for industrial, hygienic, medical, therapeutic, photographic, scientific and other purposes to which bromine and iodine solutions are to be put, such as oxidizing, halogenizing, photographic and other applications thereof.

It is a well known fact that bromine is only slightly soluble in water, the solution containing on an average about 3% (three per cent) of bromine. According to my invention, however, a very strong aqueous solution of bromine may be obtained by the use of the sulpho-cyanic acid NC.SH or its salts, for instance, of the alkali metals or ammonium salts. The amount of bromine in the solution thus obtained may be further increased by the addition of a soluble metal salt to such solution. Of these salts I may use preferably bromides or chlorides, which cause free bromine to become liberated which is immediately dissolved in the liquid, while the metal combined with the haloid-element or with the other acid radicle employed combines with the sulpho-cyanic acid to form metal-sulpho-cyanates or rhodanates. By employing iron salts a solution is obtained in this manner possessing a deep red color, due to the dissolving of the iron in the sulpho-cyanic acid. The iron salt is capable of dissolving additional quantities of bromine and of other halogens, so that it is possible to add new quantities of bromine or of iodine to the aqueous solution thus obtained which are completely dissolved, thereby producing very strong aqueous solutions of such halogens.

The reaction is probably effected in the following manner. In the first place the sulphocyanate of alkali is probably converted into the alkali-bromide by mutual reaction, the said bromide reacting with the metal salt, for instance with the tri-valent iron-halogenide in such a manner as to produce free bromine by mutual reaction, somewhat as follows:—

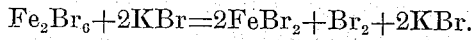
$$Fe_2Br_6 + 2KBr = 2FeBr_2 + Br_2 + 2KBr.$$

and in a similar way:—

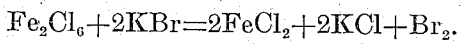
$$Fe_2Cl_6 + 2KBr = 2FeCl_2 + 2KCl + Br_2.$$

In the latter case KCl is again reacting with bromine to form the bromide which is adapted to dissolve new quantities of bromine or of iodine.

By this means a reddish brown or deep red solution is obtained possessing the true color of the usual pharmacopœia-iodine tincture, and showing the identical odor and action upon the skin, and also being equivalent therewith and for a great many purposes superior to the usual iodine tincture. It therefore becomes possible to produce a perfect substitute of this preparation without the use of the expensive iodine salts or of alcohol or the like as solvents and even without the use of iodine itself at all. On the other hand the preparation may be employed for all the various uses of bromine solutions, thus for instance as a disinfectant, as an oxidizing agent in chemical work, for photographic and many other purposes.

As an example for the carrying out of the process of this invention I may mention the following:—For the manufacture of, say two liters of solution one may proceed as follows:—16.2 grammes chloride of iron are dissolved in 30 grammes of water. To this solution and at the temperature of the room 19.9 grammes of bromide of alkali are added, preferably potassium bromide. After complete solution is obtained 15.6 grammes of sulpho-cyanate of potash in solid condition are added, and diluted with water to make 2 liters. Finally 7.9 grammes of bromine are added to the solution, whereby a deeply dark red liquid of the peculiar sharp pungent smell of the standard official iodine tincture is obtained which in this and other respects bears a perfect semblance to that official preparation and may be used in place thereof for all of its applications for therapeutical, hygienic and industrial purposes.

It should, of course, be understood that my invention is not restricted to the particular means and percentages and modes of procedure and chemicals herein described merely by way of exemplification of its principles, but modifications and changes may occur in accordance with varying conditions of applications, other salts being used and different halogens being employed within the meaning and ambit of the claims hereunto appended.

I claim:—

1. The process of dissolving bromine, which consists in dissolving the same in aqueous solutions of sulphocyanic acid combinations.

2. The process of producing bromine solutions, which consists in dissolving bromine in aqueous solutions of sulphocyanates.

3. The process of producing bromine solutions, which consists in dissolving bromine in aqueous solutions of sulphocyanates in the presence of water soluble metal salts.

4. The process of producing bromine solutions which consists in dissolving bromine in aqueous solutions of sulphocyanates in the presence of soluble iron salts.

5. The process of producing bromine solutions which consists in dissolving bromine in aqueous solutions of sulphocyanates in the presence of iron salts and adding free halogens to the solution.

6. The process of producing bromine solutions, which consists in dissolving bromine in aqueous solutions of sulphocyanates in the presence of iron salts and adding iodine to the solution.

7. A composition of matter, being a solution of bromine in aqueous solution of sulpho-cyanate-compounds.

8. A composition of matter, being a solution of bromine in aqueous solutions of sulpho-cyanates in the presence of metal salts.

9. A composition of matter, being a solution of bromine in aqueous solutions of sulpho-cyanates in the presence of iron-salts.

10. A solution of bromine in aqueous solutions of sulpho-cyanates in the presence of iron salts and containing iodine and of deep red color.

11. A composition of matter, being a solution of bromine in aqueous solutions of sulpho-cyanates in the presence of iron salts, and containing additional quantities of halogens, and of deep reddish brown color.

HANS FRIEDENTHAL.